US009258412B1

(12) United States Patent
Trandal et al.

(10) Patent No.: US 9,258,412 B1
(45) Date of Patent: *Feb. 9, 2016

(54) ENHANCED SERVICE LEVELS FOR CALL-PROCESSING SERVICES (71) Applicant: CALLWAVE COMMUNICATIONS, LLC, Brookline, MA (US)

(72) Inventors: David S. Trandal, Santa Barbara, CA (US); David J. Brahm, Santa Barbara, CA (US); David F. Hofstatter, Santa Barbara, CA (US); Robert F. Smith, Newbury Park, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,951

(22) Filed: Dec. 10, 2014

Related U.S. Application Data

(63) Continuation of application No. 14/180,190, filed on Feb. 13, 2014, now Pat. No. 8,929,258, which is a continuation of application No. 13/444,312, filed on Apr. 11, 2012, now Pat. No. 8,670,536, which is a continuation of application No. 12/783,014, filed on May 19, 2010, now Pat. No. 8,165,278, which is a continuation of application No. 10/867,944, filed on Jun. 14, 2004, now Pat. No. 7,742,586.

(51) Int. Cl.
*H04M 3/42* (2006.01)

(52) U.S. Cl.
CPC ...................................... *H04M 3/42* (2013.01)

(58) Field of Classification Search
CPC ... H04L 12/1818; H04L 12/1822; H04M 3/42
See application file for complete search history.

(56) References Cited

U.S. PATENT DOCUMENTS

| 3,936,613 | A | 2/1976 | Nishigori et al. |
| 3,956,595 | A | 5/1976 | Sobanski |
| 4,009,337 | A | 2/1977 | Sakai et al. |
| 4,022,983 | A | 5/1977 | Braun et al. |
| 4,485,470 | A | 11/1984 | Reali |

(Continued)

FOREIGN PATENT DOCUMENTS

| CA | 1329852 | 5/1994 |
| EP | 1 120 954 A2 | 8/2001 |

(Continued)

OTHER PUBLICATIONS

Article: Johnson, Dave; "Now You're Talking-voice-response systems for home offices—Product Information"; *Home Office Computing*: http://www.findarticles.com: Feb. 1999.
Article: Communications-SMS, Dashboard Widgets—Showcase; http://www.dashboardwidgets.com/showcase/details. php?wid=1082; Oct. 14, 2005; 2 pages.

(Continued)

*Primary Examiner* — Jianye Wu
(74) *Attorney, Agent, or Firm* — Knobbe, Martens, Olson & Bear LLP (57) ABSTRACT

Service levels for call-processing are enhanced based on the subscriber status of at least one of the calling party and the called party. In one example, a calling party (caller) places a call to a called party (recipient). At least one of the parties subscribes to a call-processing service and the call normally would be processed according to a predetermined service level. However, the service level is enhanced in response to a subscriber status for at least one of the parties, and the call is processed according to the enhanced service level.

27 Claims, 6 Drawing Sheets

(56) References Cited

U.S. PATENT DOCUMENTS

| | | |
|---|---|---|
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,327,486 A | 7/1994 | Wolff et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,544,229 A | 8/1996 | Creswell et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMillin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich et al. |
| 6,078,581 A | 6/2000 | Shtivelman et al. |
| 6,097,791 A | 8/2000 | Ladd et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,178,183 B1 | 1/2001 | Buskirk, Jr. |
| 6,181,691 B1 | 1/2001 | Markgraf et al. |
| 6,183,140 B1 | 2/2001 | Singer et al. |
| 6,208,638 B1 | 3/2001 | Rieley et al. |
| 6,212,261 B1 | 4/2001 | Meubus et al. |
| 6,222,914 B1 | 4/2001 | McMullin |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,285,745 B1 | 9/2001 | Bartholomew et al. |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,535,596 B1 | 3/2003 | Frey et al. |
| 6,539,084 B1 | 3/2003 | Long |
| 6,542,596 B1 | 4/2003 | Hill et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,662,232 B1 | 12/2003 | Nicholls et al. |
| 6,690,785 B1 | 2/2004 | Stelter et al. |
| 6,721,408 B1 | 4/2004 | Bain et al. |
| 6,744,868 B2 | 6/2004 | Mani |
| 6,751,299 B1 | 6/2004 | Brown et al. |
| 6,775,370 B2 | 8/2004 | Burg |
| 6,782,088 B1 | 8/2004 | Gabara et al. |
| 6,785,021 B1 | 8/2004 | Gordon et al. |
| 6,792,094 B1 | 9/2004 | Kirkpatrick |
| 6,804,509 B1 | 10/2004 | Okon et al. |
| 6,857,074 B2 | 2/2005 | Bobo, II |
| 6,898,275 B2 | 5/2005 | Dolan et al. |
| 6,917,672 B2 | 7/2005 | Brown et al. |
| 6,968,174 B1 | 11/2005 | Trandal et al. |
| 6,999,572 B1 | 2/2006 | Shaffer et al. |
| 7,003,087 B2 | 2/2006 | Spencer et al. |
| 7,254,226 B1 | 8/2007 | Roberts et al. |
| 7,283,813 B2 | 10/2007 | Hamanaga et al. |
| 7,318,049 B2 | 1/2008 | Iannacci |
| 7,397,910 B2 | 7/2008 | Dolan et al. |
| 7,418,091 B1 | 8/2008 | Sylvain |
| 7,418,257 B2 | 8/2008 | Kim |
| 7,433,679 B2 | 10/2008 | Lee et al. |
| 7,627,022 B2 | 12/2009 | Monroe et al. |
| 7,756,728 B2 | 7/2010 | Maughan et al. |
| 7,983,398 B2 | 7/2011 | Spiridellis |
| 8,000,455 B1 | 8/2011 | Van Haaften et al. |
| 8,059,633 B2 | 11/2011 | Heidermark et al. |
| 2002/0010616 A1 | 1/2002 | Itzhaki |
| 2002/0015486 A1 | 2/2002 | Saito et al. |
| 2002/0097710 A1 | 7/2002 | Burg |
| 2002/0160819 A1 | 10/2002 | Daurensan |
| 2002/0184307 A1* | 12/2002 | Pineau .................... 709/203 |
| 2003/0039339 A1 | 2/2003 | Luehrig et al. |
| 2003/0095650 A1 | 5/2003 | Mize |
| 2004/0028203 A1 | 2/2004 | Wurster et al. |
| 2004/0190706 A1 | 9/2004 | Fleischer, III et al. |
| 2004/0258220 A1 | 12/2004 | Levine et al. |
| 2005/0021593 A1* | 1/2005 | Fitzgerald et al. ............ 709/200 |
| 2005/0053216 A1 | 3/2005 | Spencer et al. |
| 2005/0111653 A1 | 5/2005 | Joyce et al. |
| 2005/0123118 A1 | 6/2005 | Terry et al. |
| 2005/0152521 A1* | 7/2005 | Liljestrand ............... 379/201.03 |
| 2005/0154599 A1 | 7/2005 | Kopra et al. |
| 2005/0156700 A1 | 7/2005 | Chang |
| 2005/0201534 A1 | 9/2005 | Ignatin |
| 2005/0207556 A1 | 9/2005 | Gonzalez et al. |
| 2006/0013374 A1 | 1/2006 | Fleisher, III et al. |
| 2006/0227957 A1 | 10/2006 | Dolan et al. |
| 2006/0268007 A1 | 11/2006 | Gopalakrishnan |
| 2007/0002077 A1 | 1/2007 | Gopalakrishnan |
| 2007/0067738 A1 | 3/2007 | Flynt et al. |
| 2007/0202898 A1 | 8/2007 | Bae et al. |

FOREIGN PATENT DOCUMENTS

| | | |
|---|---|---|
| JP | 10-513632 | 12/1998 |
| JP | 11-506292 | 6/1999 |
| JP | 2001-168989 | 6/2001 |
| WO | WO 96/18948 A1 | 6/1996 |
| WO | WO 97/26749 A1 | 7/1997 |

(56) References Cited

FOREIGN PATENT DOCUMENTS

| WO | WO 98/36551 A1 | 8/1998 |
| WO | WO 00/60840 | 10/2000 |
| WO | WO 01/76210 A1 | 10/2001 |

OTHER PUBLICATIONS

Article: "Widget MySpace Widget"; posted by 4INFO Bob; http://4info.typepad.com/blog/2006/09/widget_myspace_.html; Sep. 15, 2006; 3 pages.

* cited by examiner

ENHANCED SERVICE LEVELS FOR CALL-PROCESSING SERVICES

REFERENCE TO RELATED APPLICATIONS

The application is a continuation of U.S. application Ser. No. 14/180,190, filed Feb. 13, 2014, which is a continuation of U.S. application Ser. No. 13/444,312, filed Apr. 11, 2012, now U.S. Pat. No. 8,670,536, which is a continuation of U.S. application Ser. No. 12/783,014, filed May 19, 2010, now U.S. Pat. No. 8,165,278, which is a continuation of U.S. application Ser. No. 10/867,944, filed Jun. 14, 2004, now U.S. Pat. No. 7,742,586, the contents of which are incorporated herein by reference in their entirety.

BACKGROUND OF THE INVENTION

1. Field of the Invention

The present invention relates to providing enhanced service levels for call-processing services, for example during calls between subscribers to the call-processing service.

2. Description of the Related Art

With recent advances in telecommunications technology, service providers are providing more and more complex call-processing services to their subscribers. For example, call-processing services that are available to residential phone subscribers can include answering machine service, caller ID, call waiting, call forwarding, call blocking, and three-way calling, to name just a few. Furthermore, the advent of call handling and call-processing by technologies other than the public switched telephone network (PSTN) has enabled additional call-processing services. Internet answering machine, Internet call waiting, fax-to-email, and voice over IP are just a few examples.

Providers of these call-processing services typically generate revenue by selling these services. The more services that subscribers buy; the more revenue is generated for the service provider. For convenience, the bundle of services purchased by a subscriber shall be referred to as the subscriber's service level. The service level for different subscribers can differ not only in which services are subscribed to, but also the quality of the particular service. As an example of the former, one subscriber might purchase Internet answering machine and fax-to-email, whereas another only purchases Internet answering machine. As an example of the latter, one subscriber might purchase Internet answering machine with a voice mailbox size of 10 minutes and maximum length of 30 seconds per voice mail, and another might purchase Internet answering machine with a voice mailbox size of 30 minutes and maximum voice mail length of 60 seconds.

In order to generate more revenue, service providers generally desire to enroll new subscribers and/or upgrade the service levels for existing subscribers. One way that service providers attempt to do this is by advertising. Advertising campaigns announcing the roll out of new services, attempts to generate media coverage or buzz for certain services, and ad placements in traditional media are all attempts to obtain new subscribers and/or to persuade existing subscribers to upgrade their service levels. However, advertising can be expensive and its effectiveness is not always apparent.

When multiple service providers offer similar services, service providers often will also want to differentiate subscription to their service from subscription to the other services. Service providers will want to somehow make their subscriptions "sticky" in order to prevent subscribers from switching to other service providers. In recent years, some telecommunications service providers have introduced billing plans that are favorable to their subscribers. For example, T-Mobile offers a wireless service where there is no per-minute charge if the calling party and the called party both subscribe to T-Mobile. However, although the pricing depends on whether both parties subscribe to T-Mobile, the actual service level does not.

Adding to these impediments, subscribers may not realize that they want a service until they actually try it. For example, a subscriber may believe he does not need fax-to-email because he does not receive that many faxes and therefore does not need email notification and/or email delivery of the faxes. He may be content to wait until he returns to the office to pick up any faxes sent to him. However, once he tries fax-to-email, he may find that the service is actually very useful to him, for example perhaps because the email-based fax delivery service is more secure or perhaps because he receives more faxes due to the convenience of the service. Service providers have offered free or reduced rate trial periods where subscribers can try new services. However, this still requires the subscriber to take the initiative of signing up for the trial period. It can also require significant resources from the service provider just to set up and administer the trial.

Thus, there is a need for new approaches to call-processing services that provide greater value to subscribers who sign up for higher service levels. There is also a need for new approaches to enroll new subscribers and to encourage existing subscribers to upgrade their service levels.

SUMMARY OF THE INVENTION

The present invention overcomes the limitations of the prior art by enhancing service levels based on the subscriber status of at least one of the calling party and the called party. In one example, a calling party (the caller) places a call to a called party (the recipient). At least one of the parties subscribes to a call-processing service and the call normally would be processed according to a predetermined service level. However, the service level is enhanced in response to a subscriber status for at least one of the parties, and the call is processed according to the enhanced service level.

The determination of whether to enhance the service level can be decided in many different ways. For example, enhancement can be determined based on the caller's and/or the recipient's service level. In one approach, the higher service level of the two parties is used, assuming both parties are subscribers. In another approach, additional enhancements are made for subscribers calling other subscribers or for subscribing to higher service levels. In another approach, service levels are enhanced depending on whether the party(s) have somehow been determined to be "important," for example by being listed in a subscriber's address book.

Different types of enhancement are also possible. For answering machine services, the length of the voice mail message can be increased, the recipient's personal greeting could be played instead of a default greeting, or the number of voice mail editing options could be increased, to name just a few. For call waiting or call notification type services, call notification can be delivered more quickly or with higher priority or in real-time, or call notification can include displaying the caller's name and/or caller ID. In addition, the recipient can be enabled to accept the incoming call, the maximum length for the resulting call connection can be increased, or the call or the voice mail can be streamed to the recipient or delivered by email or other electronic means.

In one architecture for implementing service level enhancement, a call-processing system is connected to the public switched telephone network (PSTN) and to the Internet. The call is switched by the PSTN to the call-processing system. For example, the call may be call forwarded from the recipient's phone line when it is busy. The call-processing system determines whether service level enhancements are in order and then processes the call according to the enhanced service level. The call-processing system provides call notification, call streaming and other services to the recipient via the Internet (e.g., to the recipient's computer).

Other aspects of the invention include other methods, devices and systems corresponding to the above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
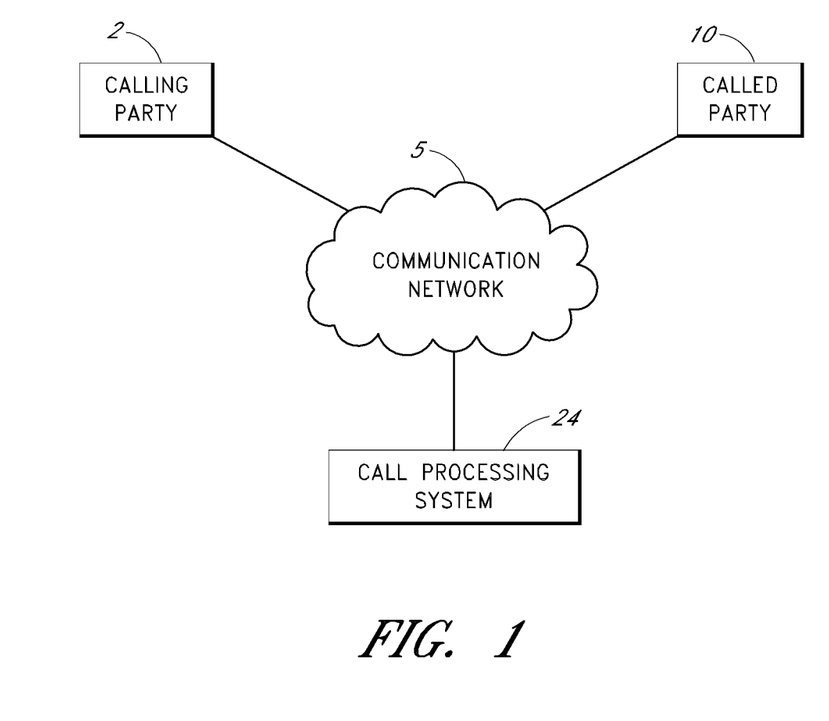
FIG. 1 is a block diagram of a telecommunications system suitable for use with the invention.

FIG. 1 is a block diagram of a telecommunications system suitable for use with the invention. In this figure, a calling party 2 (or caller) places a call to the called party 10 (or recipient) via a communications network 5. At least one of the two parties 2, 10 subscribes to a call-processing service, which is handled by call-processing system 24. In this diagram, the call-processing system 24 is shown separate from the communications network 5 for clarity. Depending on the application, some or all of the call-processing system 24 may be implemented within the communications network 5 and/or devices operated by either party 2, 10.

The system operates as follows. The call placed by the caller 2 is received, in this case by the call-processing system 24. Normally, call-processing (which includes processing of voice calls as well as fax calls) would be applied according to a predetermined service level, typically defined by the subscriber's contract. However, in certain situations depending on the subscriber status of the party(s), the service level will be enhanced and the call will be processed according to the enhanced service level.

As an example, assume that the recipient 10 subscribes to an Internet answering machine service. This service takes messages and then allows retrieval of the messages via the Internet. Thus, a caller 2 typically will leave a message for the recipient and then hang up. Now also assume that a specific caller 2 also subscribes to the Internet answering machine service but at a higher service level that also includes an Internet call connection service. The call connection service allows the subscriber to receive calls on his computer via the Internet. Normally, the recipient 10 would not have this option since he has not subscribed to this service. However, since the caller 2 has subscribed, the recipient's service level is enhanced for this call and the recipient 10 is given the option of taking the call on his computer.

This approach to enhancing service levels has many benefits. First, it can be a good way to offer free trials of services. Second, it can increase the value of higher service levels. As a final example, it can increase word of mouth marketing for services. If the recipient 10 is curious or has questions about the Internet call connection service, he can immediately ask the caller 2 who is a regular subscriber to the service. One advantage of dynamic enhancement of service level is that the added value received by both the caller and the recipient preferably should cause both parties to promote the service to other non-subscribers, thereby reducing subscriber churn and improving growth of the subscriber base. In addition, the caller 2 becomes a promoter of a higher level of service on behalf of the service provider.

Figure 2:
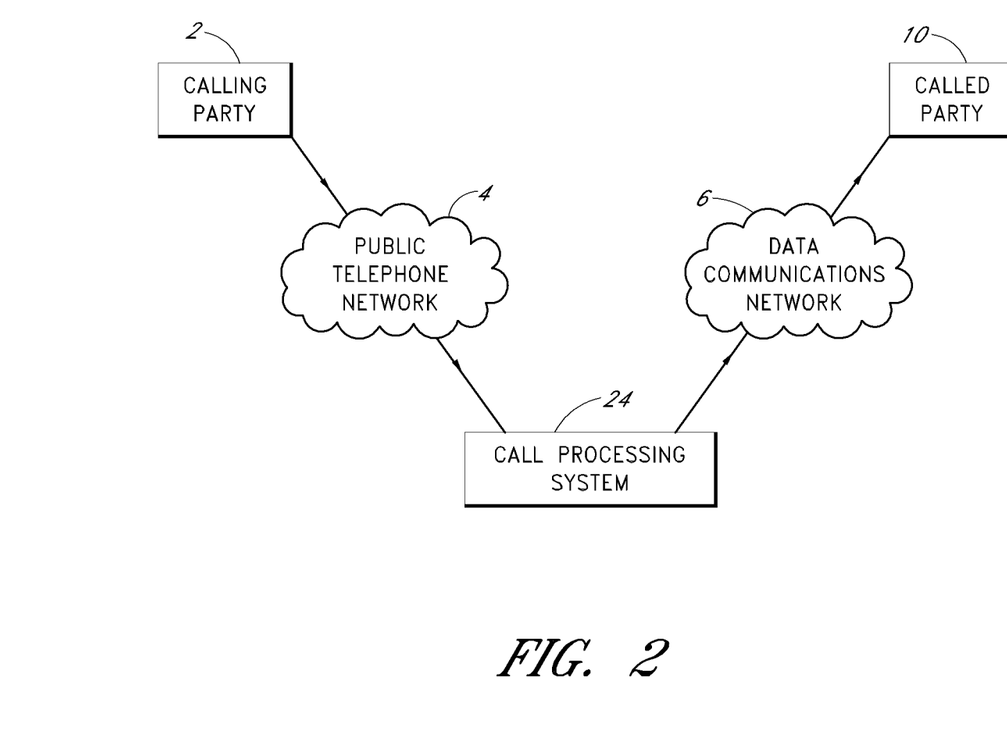
FIG. 2 is a block diagram of another telecommunications system according to the invention.

FIG. 2 is a block diagram of a more specific example. Two networks are shown in FIG. 2: a public telephone network 4 and a data communications network 6. Examples of the public telephone network 4 include the PSTN, Voice over IP (VoIP) networks, and wireless networks. Examples of data communications network 6 include the Internet, virtual private data networks, and Wide Area Networks (WANs). The data communications network 6 may carry information besides just data. For example, it may carry both voice and data simultaneously.

A caller 2 is connected to the public telephone network 4 (e.g., by a phone or fax machine) and a recipient 10 is connected to the data communications network 6 (e.g., by a computer or other data device). A call-processing system 24 is connected to both networks 4, 6. The connections can be made either directly or indirectly. For recipient 10, examples of data devices include computers, Personal Digital Assistants (PDAs), and devices that combine both voice and data (e.g., a Handspring Treo). The data device can be connected to the data communications network 6 by any means, including a dial-up connection, a broadband connection (e.g., DSL, cable or direct fiber), a direct connection to the core of the data communications network 6, or wireless access. The connections can be either permanent or temporary. In addition, although the call-processing system 24 shown in FIG. 2 is depicted as a single box, it should be understood that parts of the call-processing system 24 may be distributed among the different devices 2, 10 and networks 4, 6.

In FIG. 2, when a caller 2 places a call to the recipient 10, the call is intercepted, received and handled by the call-processing system 24. For example, the call may be forwarded from the recipient's phone number to a phone number for the call-processing system 24, including Call Forward on Busy (the call is forwarded when the recipient's phone number is busy), Call Forward All (forward all calls regardless of the state of the recipient's phone number), and Call Forward No Answer (forward the call if the recipient's phone number rings but is not answered). Alternately, the recipient's phone number may terminate at the call-processing system 24 so that the call is routed directly to the can-processing system. For example, the recipient may be assigned a local phone number that terminates at the call-processing system 24. If the recipient already has a phone number, it can be local-number ported—that is, ported from the local phone carrier to the call-processing system 24, so that calls terminate directly at the call-processing system.

Figure 3:
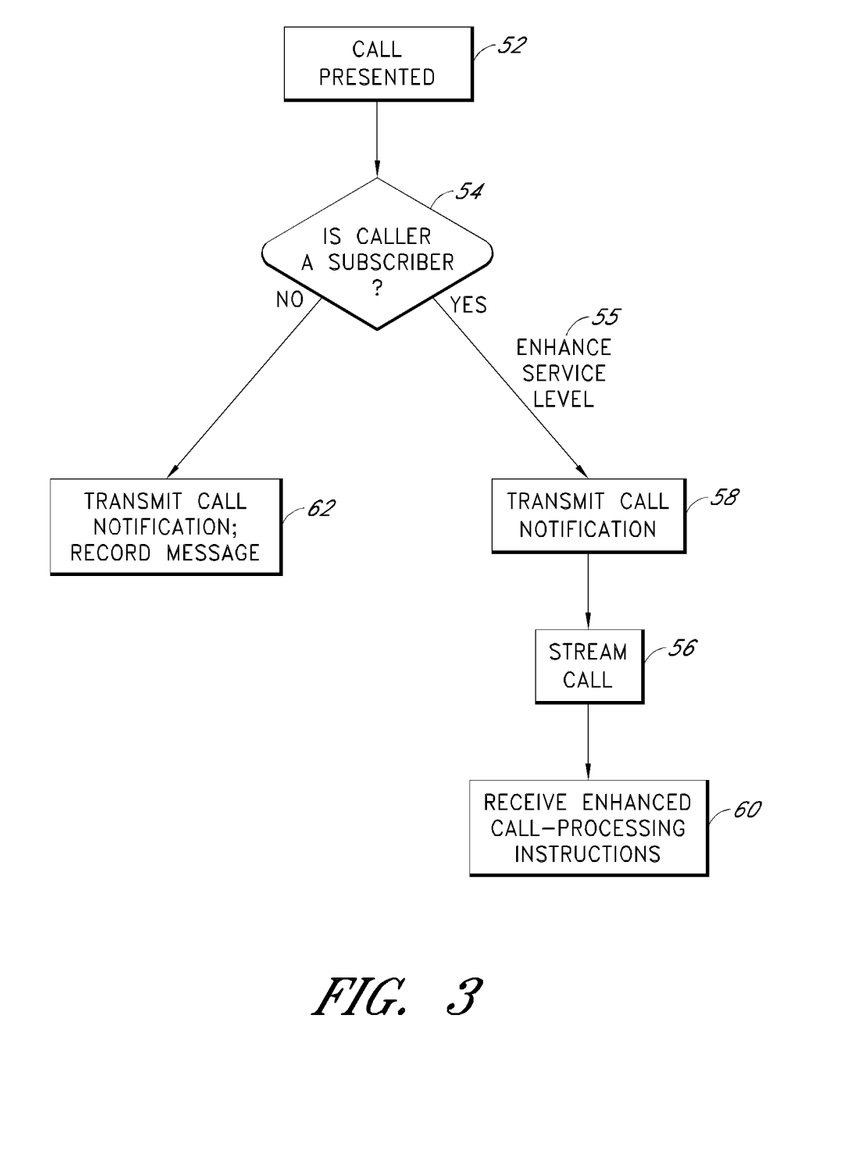
FIG. 3 is a composite flow diagram illustrating different aspects of operation of the system in FIG. 2.

FIG. 3 is a composite flow diagram that shows some of the different call-processing options that can be implemented with the invention. Different call-processing systems 24 can implement the different features shown in FIG. 3. The recipient 10 is assumed to be a subscriber for an Internet call waiting service provided by the call-processing system 24. As such, the call-processing system 24 has default rules for processing calls destined for recipient 10. Upon receiving 52 a call, the default is for the call-processing system 24 to handle the call according to these default rules. In this example, the default is for the call-processing system 24 to automatically answer the call, send 62 a notification to the recipient 10 and record 62 a voice mail message.

Before executing the default rules, the call-processing system 24 determines 54 whether the caller 2 is also a subscriber. If he is, the call-processing system 24 enhances 55 the service level for this call. In this example, in addition to notifying 58 the recipient, the call-processing system 24 also begins streaming 56 the incoming call through the recipient's computer speakers. The recipient may send 60 additional instructions to the call-processing system 24 in response to either receipt of the call or the notification. For example, the recipient may elect to forward the call to a different phone number or take the call via his computer.

Figure 4:
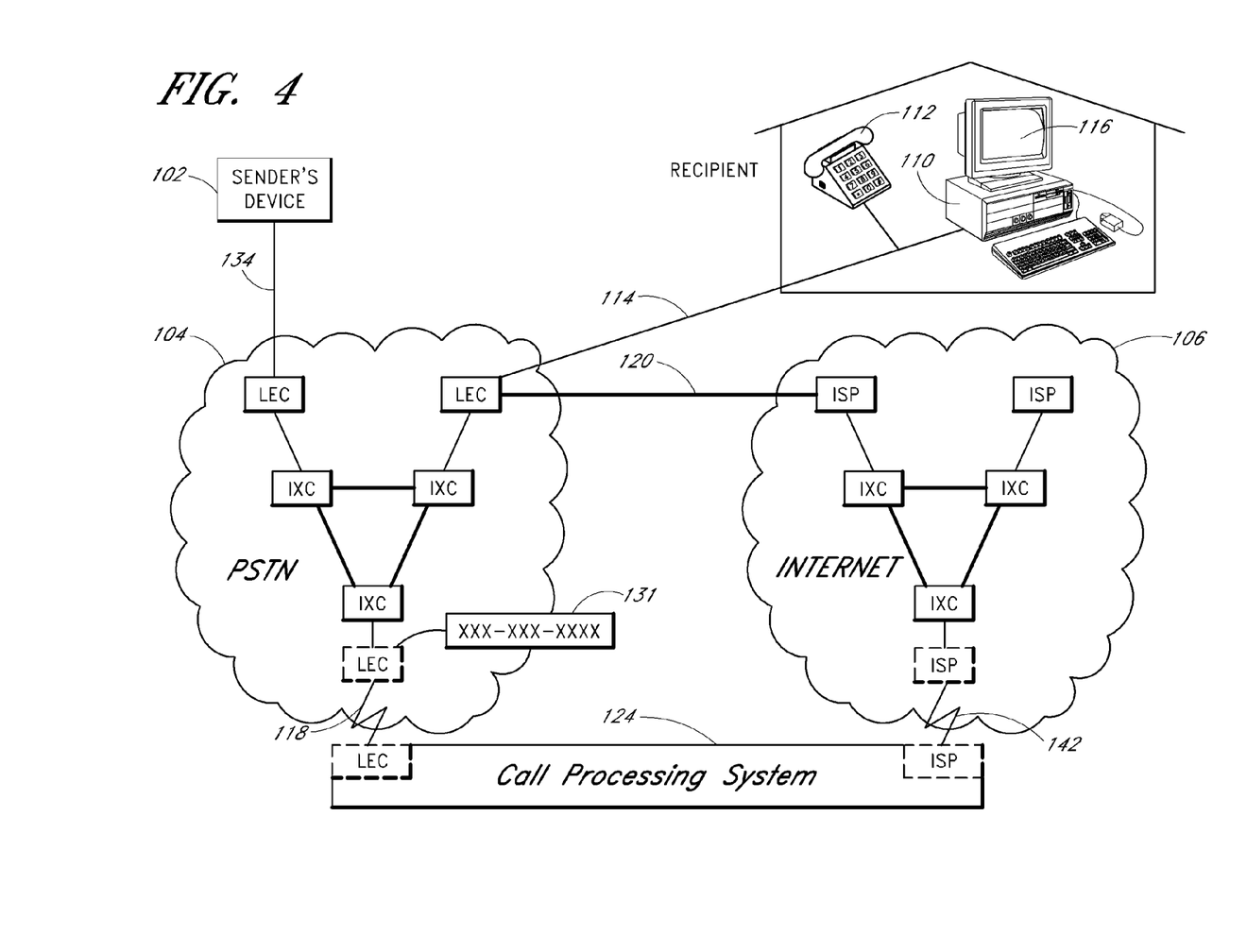
FIG. 4 is a block diagram of one implementation of the system depicted in FIG. 3.
Figure 5:
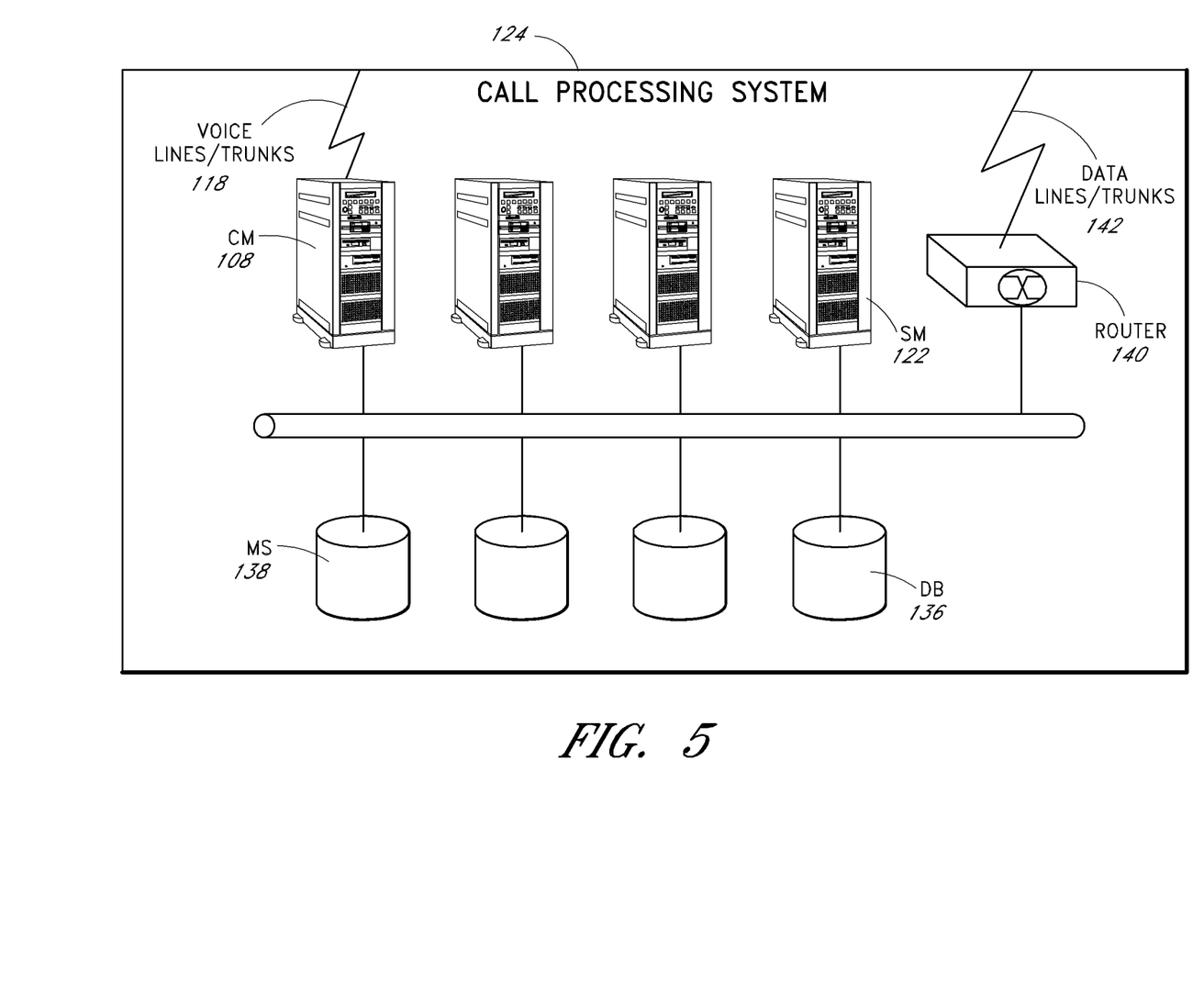
FIG. 5 is a block diagram showing further details of the call-processing system shown in FIG. 4.
Figure 6:
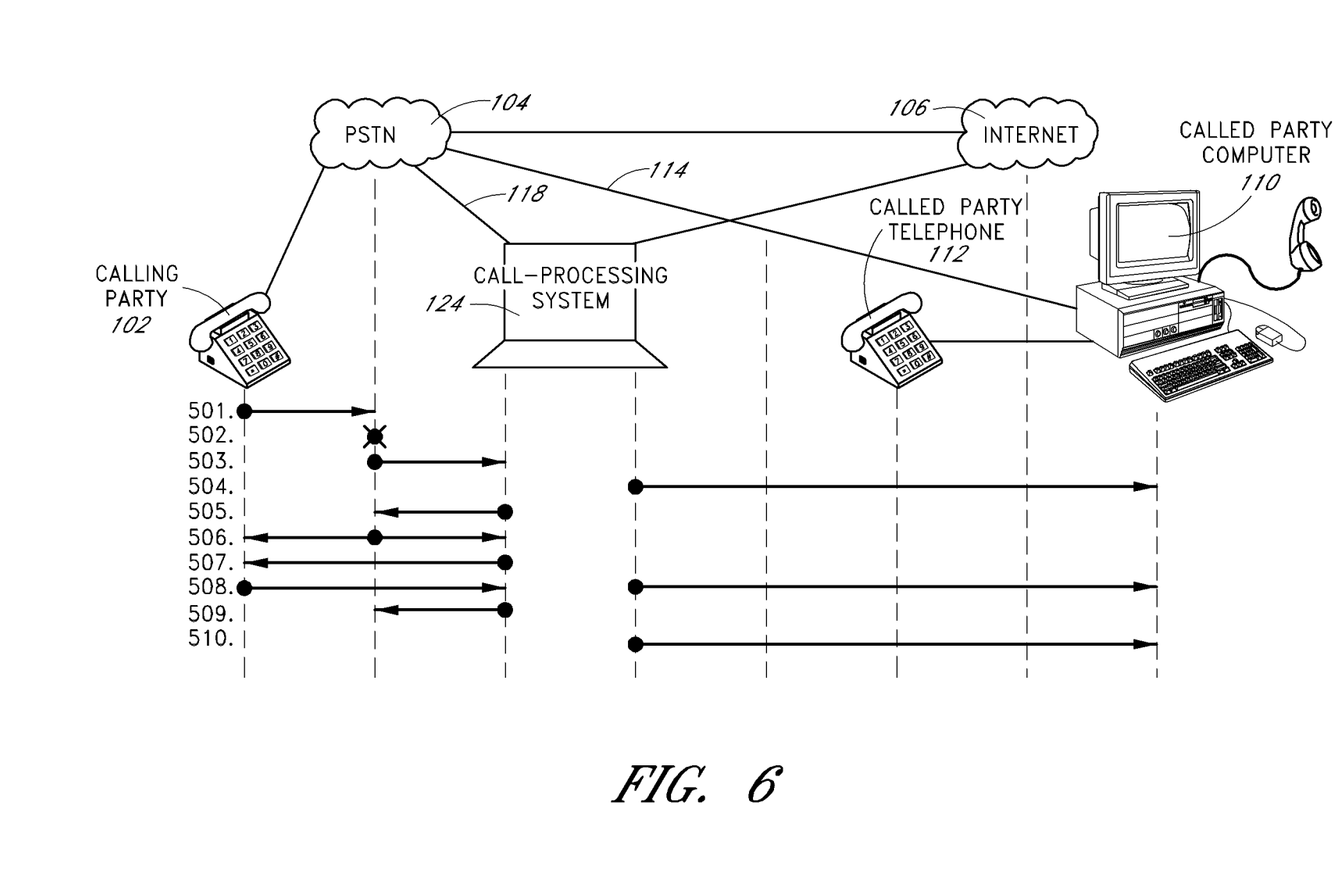
FIG. 6 is a call flow diagram illustrating an example function implemented by the system depicted in FIGS. 4 and 5.

FIGS. 4-6 illustrate a specific implementation of the system shown in FIGS. 1-3. In this implementation, the public telephone network 4 includes the PSTN 104, and the data communications network 6 includes the Internet 106. The recipient 10 is using a computer terminal 110 to access the Internet 106 via a dial-up connection.

FIG. 5 shows the details of one-implementation of the call-processing system 124. It includes a call management (CM) subsystem 108, a router subsystem 140, an online presence-detection Internet session management (SM) subsystem 122, a shared media storage (MS) subsystem 138, and a database (DB) subsystem 136. The CM subsystem 108 interfaces to the PSTN 104 and manages inbound and outbound calls. The router subsystem 140 interfaces to the Internet 106 and manages communications between the recipient's data devices and the various servers. The SM subsystem 122 monitors the status of the recipient's data devices to determine availability for call notification and delivery services. The MS subsystem 138 persistently archives voice messages. The DB subsystem 136 contains records for subscribers. It also contains rules to be applied for call handling/processing and for determining the enhancement of service levels. It may also store subscribers' address books and/or preferences. These various subsystems may be interconnected via Local Area Networks (LANs), private virtual networks running over the Internet and/or Wide Area Networks (WANs).

Referring to FIG. 4, the caller's telephone 102 is connected to a Local Exchange Carrier (LEC) switch via telephone lines 134. The caller's phone 102 can be directly connected to the LEC over conventional POTS (Plain Old Telephone System) lines or via local extension lines behind a corporate Private Branch Exchange (PBX).

In FIG. 5, the CM subsystem 108 is connected to the PSTN 104 via voice trunk circuits 118 that directly interface with the Inter Exchange Carrier's (IXC) circuit-switched or packet-switched telephony network. Thus, advantageously, the call-processing system 124 does not have to be directly serviced by the same LEC switch or PBX. Because of this, the call-processing system 124 or its individual subsystem components can be located in a different geographical area (e.g., a different country) than the sender and recipient. In this embodiment, the call-processing system 124 is locally attached to a LEC switch with a physical line or local trunk interface circuit. In such cases, the switch may or may not be serving the caller's telephone 102. In yet another embodiment, the CM subsystem 108 may be connected to the PSTN 104 via a VoIP network and associated routers 142.

The trunk circuits 118 are not limited to a particular signaling convention. For example, the present invention can be utilized with a Common Channel Signaling (CCS) system, such as Signaling System 7 (SS7), that has separate voice/user data and signaling channels. In addition, the present invention can be used with other signaling methods, such as the following trunk-side signaling interfaces: ISDN-PRI, Advanced Intelligent Network (AIN), and/or Service Node architectures. Preferably, the selected signaling system provides a suite of call-presentation information to the call-processing system 124, including one or more of the following:

ANI—Automatic Number Identification ("Caller ID"): the phone number and privacy indicator of the calling party (the caller in this example).

DNIS—Dialed Number Identification System: the phone number of the called party or of the call processing system in the case of a forwarded call.

OCN/Redirecting—Original Called Number Identification: phone number of the original called party (the recipient in this example) in the case of a forwarded call.

The telephone line 114 may be shared with one or more computer terminals 110. For example, telephone 112 shares the telephone line 114 with a computer terminal 110. In this example, the telephone line 114 is used to establish a dial-up connection for a computer terminal 110, via the computer modem, to an Internet Service Provider (ISP) offering dial-in remote-access service connections from the PSTN 104 via trunk interface circuits 120. The computer terminal 110 can also be connected to the Internet 106 via a broadband connection (such as a DSL or cable modem service, or a T1 line). While the recipient's data device is shown as a computer terminal 110 in FIG. 4, it can also be an interactive television, a network-enabled PDA, another IP (Internet Protocol) device, or the like. If the computer terminal 110 is a personal computer, it can be equipped with a monitor, keyboard, mouse, disk drive, sound card (or similar sound-reproduction circuitry, such as a codec), streaming media playback software (such as Microsoft's Media Player program), speakers, and a modem (such as a standard V.90, 56K dial-up modem).

In this implementation, a client application 116 for the call-processing system 124 resides and executes on the computer terminal 110. The client application 116 is connected to, and communicates with, the call-processing system 124 via the Internet 106.

The call-processing system 124 optionally hosts a web site used by subscribers of the service to set up and manage their accounts. Set-up and management functions can be implemented by the client application 116 as well.

The SM subsystem 122 monitors the Internet for online IP devices registered to subscribers to determine their availability for receiving calls. When a subscriber connects to the Internet using a dial-up ISP, for example, the client application 116 makes the subscriber's online presence known to the call-processing system 124. Presence detection can be performed by the SM subsystem 122 polling or pinging the client application 116, or by the client application 116 transmitting a "Login/I'm alive" message and/or subsequent periodic "Keep alive" messages to the SM subsystem 122. This is just one example of presence management. Broader presence management techniques could be employed, including IETF SIMPLE technology.

If, rather than using a dial-up connection, the subscriber is using a broadband, always-on connection (such as a DSL or cable modem service), the client application 116 typically becomes active when the computer terminal 110 is turned on or powered up, and it stays on until the subscriber manually shuts down the client application 116 or the computer 110 is turned off or powered down.

FIG. 6 is a call-flow diagram that illustrates one example of call handling. For clarity, the full details shown in FIGS. 4-5 are not repeated in FIG. 6. In this example, the calling party 2 places the call from telephone 102 and the recipient 10 normally would receive the call on telephone 112. The recipient subscribes to a service that transmits a call notification to the recipient when the recipient's phone line 114 is busy.

The calling party calls 501 the called party phone line 114 connected to the telephone 112 and computer 110. In this example, the computer 110 is using the phone line 114 to access the Internet 106 or other computer network, and so is online. The PSTN 104 detects that the called party phone line 114 is busy 502. In accordance with a call forwarding service 503, the PSTN 104 forwards the call on busy to the call-processing system 124 via the voice trunk circuits 118. The call-processing system 124 receives 503 the incoming call and, based at least in part on the phone number called (obtainable from the Redirecting/OCN number field for example), the CM subsystem 108 queries the SM subsystem 122 and the DB subsystem 136 to determine whether the forwarded number is registered to a subscriber and if so, then the recipient's service level, what the recipient's call-handling preferences are, and whether the recipient is online. The CM subsystem 108 also queries the SM subsystem 122 and the DB subsystem 136 to determine whether the caller's phone number (obtained from the ANI number field, for example) is registered to a subscriber and if so, the caller's service level, and what the caller's call-handling preferences are. A comparison is made between the service levels of the calling and called parties and the service level is enhanced to match the higher service level of the two. In this example, assume that the enhancement adds streaming of messages, which normally is not part of the recipient's service level.

If the recipient's computer terminal 110 is online, the CM subsystem 108 opens a communication channel over the Internet 106 to the client application 116 running on the recipient's computer terminal 110. The call-processing system 124 transmits 504 a call notification to the recipient's computer terminal 110. This is a part of the recipient's regular service level.

In this example, the call notification consists of the Caller ID of the caller. The Caller ID may come from different sources. For example, it may be provided during set up of the call by the telephone network. The information may also be automatically entered into the recipient's address book. A sound notification can be included in the notification in the form of ringing, which is produced through the recipient's computer 110 speakers. In addition, the CM subsystem 108 performs a Caller Name database lookup using the Caller ID of the caller. The Caller Name, if available, is transmitted 504 to the client application 116 and displayed to the recipient.

Around the same time (it may be before or after), the call-processing system 124 answers 505 the incoming call and establishes 506 a full-duplex (two-way) talk path with the caller. The CM subsystem 108 plays 507 a greeting to the caller and then records and stores the caller's voice message in the MS subsystem 138. As an enhancement to the recipient's regular service level, the CM subsystem 108 simultaneously streams 508 the voice through the opened Internet channel to the client application 116 (or other media player) on the recipient's computer terminal 110. The client application 116 or media player plays the message to the recipient. The subscriber is presented an option to "take-the-call" on his computer or transfer the call to another phone.

If the subscriber chooses not to take the call, after the caller completes his/her message, the call is terminated 509. The call-processing system 124 releases trunk resources and signals 509 call termination to the PSTN 104. The call-processing system 124 also signals 510 completion of the call to the recipient by sending a corresponding control message, which is displayed to the recipient, via the client application 116, as an entry in the call log (for example, 30-second call).

In conventional approaches, services ordered by a subscriber function in a predetermined manner, as specified by a user manual or by contract, and service levels are not affected by service interaction with other subscribers. By using the approach described above, if a service provider determines that the caller and/or recipient were subscribers, the provider could enhance the experience for both parties. For example, the telecommunications provider could increase the message recording length from 30 seconds to 1 minute for all callers who subscribe to the provider's service. The benefit of the increase would be that the caller could leave a longer, more complete message while the recipient, because of the completeness of the message, may not have to return the call. Dynamic subscriber-to-subscriber service enhancements preferably would create an important incentive for the subscriber to encourage non-subscribers to subscribe to the provider's call-processing services and to encourage existing subscribers to upgrade their service levels.

Although the detailed description contains many specifics, these should not be construed as limiting the scope of the invention but merely as illustrating different examples and aspects of the invention. It should be appreciated that the scope of the invention includes other embodiments not discussed in detail above. For example, in many of the examples given above, the service level was enhanced to equal the higher service level subscribed to by either the calling party or the called party, but enhancement of service levels can be decided in other ways.

Table 1 gives an example where there are three service levels. The letter H designates the highest level of service, the letter M a mid-level of service, and the letter L the lowest level of service. Normally, the call is processed according to the service level of the called party (i.e., the service level shown in the third column). However, in this example, service levels are enhanced to match the higher of the two service levels. Columns four and five show the service level enhancement, if any, relative to the normal service level for both the calling and the called parties. Case three, for example, is an instance in which the calling party is at the highest level of service (H) and the called party is at the lowest level of service (L). Normally, the call would be processed at service level L. However, the service level is enhanced to the higher level of the calling party for the duration of the call, so the call is actually processed at service level H, as indicated by the notation L→H in column five.

TABLE 1

| Case | Call-ING | Call-ED | Service Level Match Applied to Call-ING | Service Level Match Applied to Call-ED | M to M Service Level Upgrade to Call-ING | M to M Service Level Upgrade to Call-ED |
|---|---|---|---|---|---|---|
| 1 | H | H | H | H | H -> H+ | H -> H+ |
| 2 | H | M | H | M -> H | same | same |
| 3 | H | L | H | L -> H | same | same |
| 4 | M | H | M -> H | H | same | same |
| 5 | M | M | M | M | M -> H | M -> H |
| 6 | M | L | M | L -> M | same | same |

TABLE 1-continued

| Case | Call-ING | Call-ED | Service Level Match Applied to Call-ING | Service Level Match Applied to Call-ED | M to M Service Level Upgrade to Call-ING | M to M Service Level Upgrade to Call-ED |
|---|---|---|---|---|---|---|
| 7 | L | H | L -> H | H | same | same |
| 8 | L | M | L -> M | M | same | same |
| 9 | L | L | L | L | L -> M | L -> M |
| 10 | None | H | — | H | same | same |
| 11 | None | M | — | M | same | same |
| 12 | None | L | — | L | same | same |

The sixth and seventh columns show another variation that adds more enhancements to those already existing in columns four and five. In the previous example, if both parties are subscribers, there will always be a service level enhancement except when both parties subscribe to the same service level. For example, in case five, both members have service level M, so the call is processed at service level M under columns four and five, which is not an enhancement for either party. In columns six and seven, these cases also receive service level enhancements. In case five, the service level is enhanced to H for the duration of the call. The notation "same" in columns six and seven indicate that the service level enhancement is the same as in columns four and five. In the example of columns six and seven, the service level is enhanced whenever two subscribers participate in the call. In case one, the service level of H is enhanced to become H+(an even higher level of service) because the recipient subscribes to level H and he is being called by another subscriber to level H. This might be done in order to reward or encourage subscribers to call other subscribers, to encourage subscribers to enroll in the highest level of service and/or to encourage level H subscribers to encourage their friends to upgrade to level H. In case nine, the call is enhanced to level M (rather than processed at level L), for example to encourage both subscribers to upgrade their service to level M. Note that in this example no enhancements are provided for calls originating with non-subscribers (cases 10-12). Enhancements occur only if both parties are subscribers and, in columns six and seven, enhancements always occur if both parties are subscribers.

Other methods for enhancing the service level will be apparent. For example, whether to enhance the service level or how much to enhance the service level can be based solely according to the calling party's service level, or the called party's service level, rather than on both service levels. It can also be based on other factors within the subscriber status, such as how long the subscriber has been a subscriber. It can also be based on factors within the subscriber status in combination with other factors, such as time of day, geographical location, and whether the service provider is offering a promotion.

Table 2 shows an example where enhancement occurs for "very important callers/callees" (VICs). In this example, certain parties are designated as VICs. For example, the subscriber might actively fill out a list of VICs, or designate certain parties as VICs when entered into the subscriber's address book. Alternately, VICs may be defined by the subscriber's call history, for example those parties which are called or which call the subscriber on a regular basis. Alternately, all parties in the subscriber's address book may be considered to be VICs. Regardless of the definition, in cases 1-3 of Table 2, if a VIC calls the subscriber, then the service level is automatically enhanced, even if the VIC is not a current subscriber. In cases 4-6, if a subscriber calls the VIC (e.g., by originating a call from an address book entry), then the service level is also enhanced. For example, if the calling line is busy, the subscriber might be asked if he would like a call-back when the VIC's line is available (e.g., camp-on service). In addition to improving the value of the call-processing service, this enhancement rule incentivizes the subscriber to populate his address book (if VICs are defined based on the address book).

TABLE 2

| Case | Call-ING | Call-ED | VIC Service Level Upgrade to Call-ING | VIC Service Level Upgrade to Call-ED |
|---|---|---|---|---|
| 1 | VIC | H | — | H -> H+ |
| 2 | VIC | M | — | M -> H |
| 3 | VIC | L | — | L -> M |
| 4 | H | VIC | H -> H+ | — |
| 5 | M | VIC | M -> H | — |
| 6 | L | VIC | L -> M | — |

As some final variations, there are many ways in which service levels can be enhanced. For example, for answering machine services, the maximum length of the voice mail message can be increased, the called party's personal greeting could be played instead of a default greeting, or the number of voice mail editing options could be increased, to name just a few. For call waiting or call notification type services, call notification can be delivered more quickly or with higher priority or in real-time, or call notification can include displaying the caller's name and/or caller ID. In addition, the recipient can be enabled to accept the incoming call, the maximum length for the resulting call connection can be increased, or the call or the voice mail can be streamed to the recipient or delivered by email or other electronic means.

What is claimed is:

1. A method of providing call processing services, comprising:
    communicating, by a computer system comprising hardware, with a first software program on a first computing device associated with a first user, the first user associated with an account of a communication service and entitled to a first level of service features with respect to the communication service;
    communicating, by the computer system, with a second software program on a second computing device associated with a second user, the second user associated with an account of the communication service and entitled to the first level of service features with respect to the communication service;
    receiving, at the computing system, a first call for the first user, wherein the first call is associated with call information indicating that the first call is originated from the second software program;
    based at least in part on the first user and the second user being associated with respective accounts of the communication service, enabling a call connection between the first software program and the second software program at an enhanced level of service features;
    receiving at the computing system a second call for the first user wherein the second call is placed from a telecommunication device associated with a third user; and
    based at least in part on the third user not being associated with an account of the communication service, not providing the enhanced level of service features to the first user, the third user, or the first user and the third user with respect to the second call.

2. The method as defined in claim 1, the method further comprising:
based at least in part on the first user and the second user being associated with respective accounts of the communication service, providing, in substantially real-time, an enhanced call notification to the first user;
receiving a third call for the first user wherein the third call is placed from a telecommunication device associated with a fourth user; and
determining whether an address book of the first user has an entry for the fourth user; and
providing an enhanced level of service with respect to the third call for the first user from the fourth user based at least in part determining that the address book of the first user has an entry for the fourth user.

3. The method as defined in claim 1, the method further comprising providing an enhanced level of service with respect to a third call for the first user from a fourth user based at least in part on a determination that an address book of the first user has an entry for the fourth user.

4. The method as defined in claim 1, the method further comprising: based at least in part on the first user and the second user being associated with respective accounts of the communication service, causing a name of the second user to be displayed to the first user in association with the first call.

5. The method as defined in claim 1, further comprising: based at least in part on the first user and the second user being associated with respective accounts of the communication service, providing, in substantially real-time, an enhanced call notification to the first user.

6. The method as defined in claim 1, wherein the enhanced level of service feature comprises a three-way calling feature.

7. The method as defined in claim 1, wherein the first call is over a circuit-switched or packet-switched network.

8. The method as defined in claim 1, wherein the first computing device associated with the first user comprises an interface to a broadband network.

9. The method as defined in claim 1, wherein the first computing device associated with the first user is configured to communicate using Voice over IP.

10. The method as defined in claim 1, wherein the first computing device associated with the first user comprises a voice and data device.

11. The method as defined in claim 1, wherein communicating, by the computer system, with the first software program on the first computing device associated with the first user comprises monitoring an online presence of the first software program.

12. The method as defined in claim 1, wherein the first call is a Voice over Internet Protocol call.

13. The method as defined in claim 1, wherein the telecommunication device associated with the third user comprises a telephone.

14. A system, comprising:
one or more computing devices;
a network interface; and
non-transitory computer readable memory storing program code that when executed by the one or more computing devices is configured to cause the system to at least:
communicate over the network interface with a first software program on a first computing device associated with a first user, the first user associated with an account of a communication service and entitled to a first level of service features with respect to the communication service;
communicate over the network interface with a second software program on a second computing device associated with a second user, the second user associated with an account of the communication service and entitled to the first level of service features with respect to the communication service;
receive a first call for the first user, wherein the first call is associated with call information indicating that the first call is originated from the second software program;
based at least in part on the first user and the second user being associated with respective accounts of the communication service, enable a call connection between the first software program and the second software program at an enhanced level of service features;
receive a second call for the first user wherein the second call is placed from a telecommunication device associated with a third user; and
based at least in part on the third user not being associated with an account of the communication service, not provide the enhanced level of service features to the first user, the third user, or the first user and the third user with respect to the second call.

15. The system as defined in claim 14, wherein the system is configured to:
based at least in part on the first user and the second user being associated with respective accounts of the communication service, provide, in substantially real-time, an enhanced call notification to the first user;
receive a third call for the first user wherein the third call is placed from a telecommunication device associated with a fourth user; and
determine whether an address book of the first user has an entry for the fourth user; and
provide an enhanced level of service with respect to the third call for the first user from the fourth user based at least in part determining that the address book of the first user has an entry for the fourth user.

16. The system as defined in claim 14, wherein the system is configured to provide an enhanced level of service with respect to a third call for the first user from a fourth user based at least in part on a determination that an address book of the first user has an entry for the fourth user.

17. The system as defined in claim 14, wherein the system is configured to, based at least in part on the first user and the second user being associated with respective accounts of the communication service, cause a name of the second user to be displayed to the first user in association with the first call.

18. The system as defined in claim 14, wherein the system is configured to, based at least in part on the first user and the second user being associated with respective accounts of the communication service, provide, in substantially real-time, an enhanced call notification to the first user.

19. The system as defined in claim 14, wherein an enhanced level of service feature comprises a three-way calling feature.

20. The system as defined in claim 14, wherein the first call is over a circuit-switched or packet-switched network.

21. The system as defined in claim 14, wherein the network interface comprises a circuit-switched interface and a packet-switched network interface.

22. The system as defined in claim 14, wherein the first computing device associated with the first user is configured to communicate using Voice over IP.

23. The system as defined in claim 14, wherein the first computing device associated with the first user comprises a voice and data device.

24. The system as defined in claim 14, wherein communication over the network interface with the first software program, by the computer system, comprises monitoring an online presence of the first software program.

25. The system as defined in claim 14, wherein the first call is a Voice over Internet Protocol call.

26. The system as defined in claim 14, wherein the telecommunication device associated with the third user comprises a telephone.

27. Non-transitory computer storage media, comprising instructions that when executed by the one or more computers cause the one or more computers to perform operations comprising:

communicating with a first software program on a first computing device associated with a first user, the first user associated with an account of a communication service and entitled to a first level of service features with respect to the communication service;

communicating with a second software program on a second computing device associated with a second user, the second user associated with an account of the communication service and entitled to the first level of service features with respect to the communication service;

receiving a first call for the first user, wherein the first call is associated with call information indicating that the first call is originated from the second software program;

based at least in part on the first user and the second user being associated with respective accounts of the communication service, enabling a call connection between the first software program and the second software program at an enhanced level of service features;

receiving a second call for the first user wherein the second call is placed from a telecommunication device associated with a third user; and based at least in part on the third user not being associated with an account of the communication service, not providing the enhanced level of service features to the first user, the third user, or the first user and the third user with respect to the second call.

* * * * *